(12) United States Patent
Abanami et al.

(10) Patent No.: US 7,880,727 B2
(45) Date of Patent: Feb. 1, 2011

(54) TOUCH SENSITIVE AND MECHANICAL USER INPUT DEVICE

(75) Inventors: Thamer A. Abanami, Seattle, WA (US); Patrick Baudisch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

(21) Appl. No.: 11/399,029

(22) Filed: Apr. 5, 2006

(65) Prior Publication Data

US 2007/0236470 A1   Oct. 11, 2007

(51) Int. Cl.
*G06F 3/041* (2006.01)
(52) U.S. Cl. ........................... 345/173; 345/184
(58) Field of Classification Search ............ 345/173, 345/184
See application file for complete search history.

(56) References Cited

U.S. PATENT DOCUMENTS

| | | | | |
|---|---|---|---|---|
| 4,105,902 A | * | 8/1978 | Iwai et al. ............ | 327/187 |
| 4,680,429 A | * | 7/1987 | Murdock et al. ...... | 178/20.02 |
| 6,107,997 A | * | 8/2000 | Ure ....................... | 345/173 |
| 6,262,717 B1 | * | 7/2001 | Donohue et al. ...... | 345/173 |
| 2005/0052425 A1 | * | 3/2005 | Zadesky et al. ....... | 345/173 |
| 2006/0181517 A1 | * | 8/2006 | Zadesky et al. ....... | 345/173 |
| 2007/0063967 A1 | * | 3/2007 | Wang et al. ........... | 345/156 |

* cited by examiner

*Primary Examiner*—Quan-Zhen Wang
*Assistant Examiner*—Sahlu Okebato
(74) *Attorney, Agent, or Firm*—Woodcock Washburn LLP

(57) ABSTRACT

User interfaces or input devices are provided with both touch-sensitive (e.g., capacitive) and mechanical hardware input portions. Mechanical switches are overlaid with a touch sensitive pad, providing improved versatility of input. An application programming interface (API) enables different modes of input operation for the mechanical and touch sensitive input portions, whereby various combinations and/or permutations of touch sensitive input portions and/or mechanical input portions are enabled or disabled to provide optimal input characteristics for a set of tasks at hand. Visual or audio indicators may be utilized to reveal the mode of operation to the user. The touch sensitive pad may be a capacitive touchpad, a touch sensitive display screen, a conveyor belt or a push pad. Up to 9 mechanical switches may be placed underneath the touch sensitive input portions.

20 Claims, 18 Drawing Sheets

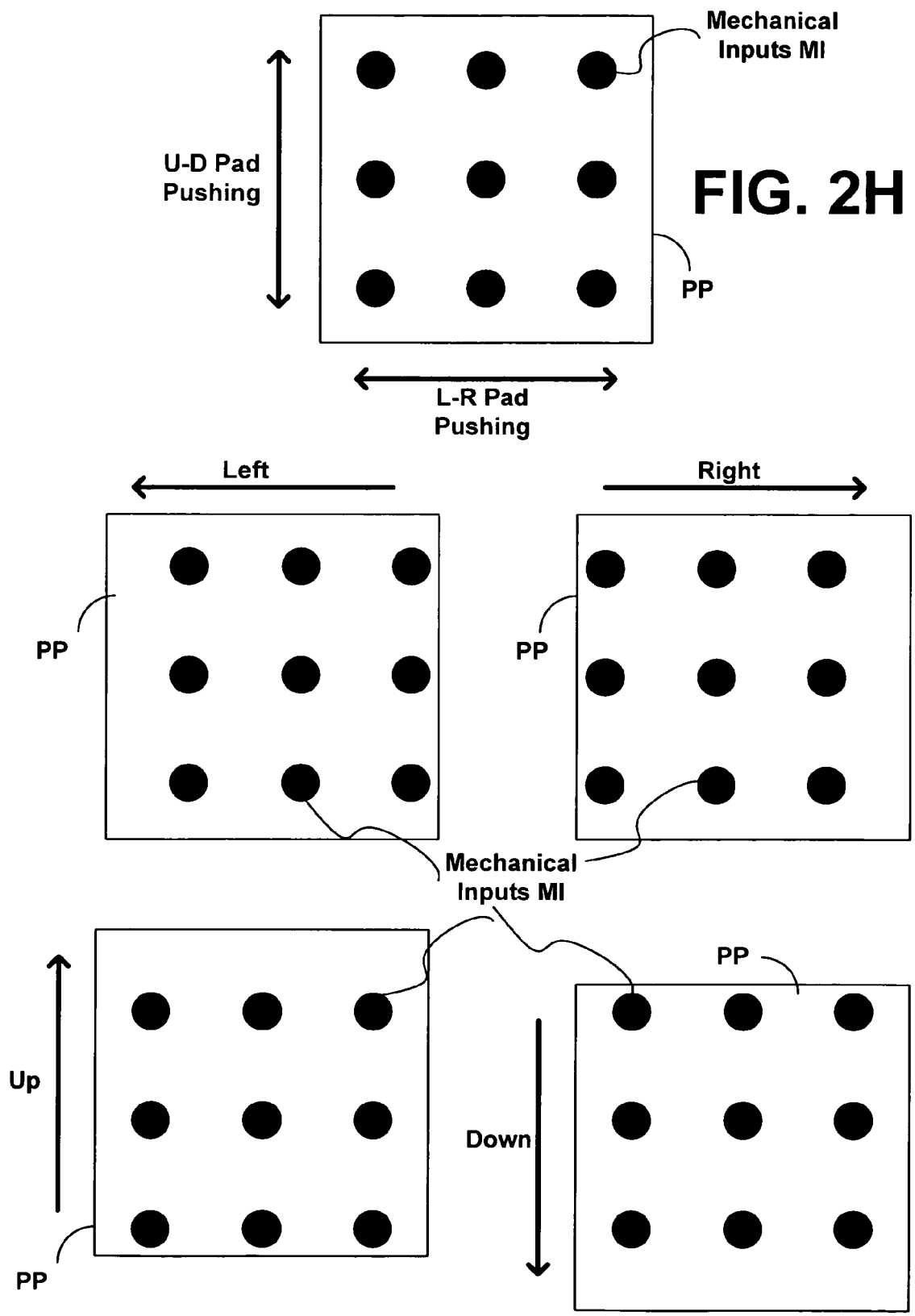

TOUCH SENSITIVE AND MECHANICAL USER INPUT DEVICE

FIELD OF THE INVENTION

The present invention relates to a user interface, such as an input pad, including touch sensitive and mechanical input portions.

BACKGROUND OF THE INVENTION

Today, portable devices such as laptops, portable media players, remote control devices and many other devices are challenged with achieving a sleek and desirable "look and feel" and industrial design while simultaneously addressing the growing requirements to take multiple types of hardware input—in order to interact with the increasingly powerful and complex software residing on these devices. Two common kinds of hardware input commonly deployed for user interfaces on computing devices, such as portable media players and remote control devices, include mechanical switches and touch sensitive sensors.

Mechanical switches, such as toggle switches, throw switches, dial switches, slide switches, etc. are termed "mechanical" because they have moving parts which engage or disengage electrical connection(s) to produce a desired result. Mechanical buttons provide a good example of mechanical switches used for input devices. As a common "on/off" scenario for a mechanical button, when the mechanical button is pressed and thus physically moved, a connection becomes engaged, producing a desired result such as "device on." Then, when the button is released (or pressed again, or moved the other direction, etc.), the connection is disengaged, producing another desired result such as "device off." The device responds to the actuation of the mechanical switches. One can appreciate that there are a variety of mechanical switches that are known in the art that behave in a more complex manner than "on/off" as well.

In contrast to mechanical switches, touch sensitive input pads operate in response to sensors that detect touch by the user. For instance, capacitive touch pads are an example of touch sensitive input pads which operate by sensing capacitance between sensors, in this case, measuring the capacitance of a user's finger (more accurately, the user's whole arm) in contact with the touchpad. Typically, capacitive sensors are laid out along horizontal and vertical axes of the touchpad and the location of the user's finger is determined from the capacitance measured by the capacitive sensors.

Some touchpads also have "hotspots," which are locations on a touchpad that indicate user intentions other than some primary functionality. For example, on certain touchpads, moving one's finger along the right edge of the touch pad will control the scrollbar and vertically scroll the current window. Similarly, moving the finger on the bottom of the touchpad can scroll a window in the horizontal direction. Some touchpads can also emulate multiple mouse buttons by either tapping in a special corner of the pad, or by tapping with two or more fingers.

Today, touchpads are primarily found in portable laptop computers, because alternative mouse devices require a flat table adjacent to use of the device. Touchpads can be advantageous because short finger movements can be used to move the cursor adequately across the display screen, i.e., some user's prefer the compact movement to the movement of a mouse device. Standalone mechanical buttons, such as buttons, slider bars, dials, etc. are also quite commonly found on devices. However, hardware input functionality above and beyond the state of the art is desired in view of mounting sophistication of devices and underlying software, and thus improved hardware user interfaces combining capacitive and mechanical hardware input technologies are desired.

SUMMARY OF THE INVENTION

In view of the foregoing, the present invention provides hardware input devices or remote control interfaces including touch-sensitive (e.g., capacitive) and mechanical hardware input portions. In various embodiments, mechanical switches are overlaid with a touch sensitive pad, providing improved versatility of input. An application programming interface (API) enables at least two modes of operation for the mechanical and touch sensitive input portions, whereby various combinations and/or permutations of touch sensitive input portion(s) and/or mechanical input portion(s) are enabled or disabled to provide optimal input characteristics for a set of tasks at hand, i.e., different modes of input operation. Visual or audio indicators may be utilized to reveal the mode of operation to the user. The touch sensitive pad may be a capacitive touchpad, a touch sensitive display screen, a conveyor belt or a push pad. In non-limiting embodiments, there are up to 9 mechanical switches underneath the touch sensitive input portions.

Other features of the present invention are described below.

BRIEF DESCRIPTION OF THE DRAWINGS

The touch sensitive and mechanical input device(s) of the invention are further described with reference to the accompanying drawings in which:

FIG. 2H is a block diagram of fourth illustrative embodiments of a user interface in accordance with the invention in which the touch sensitive input device is shown as a push pad;

DETAILED DESCRIPTION OF ILLUSTRATIVE EMBODIMENTS

Figure 1:
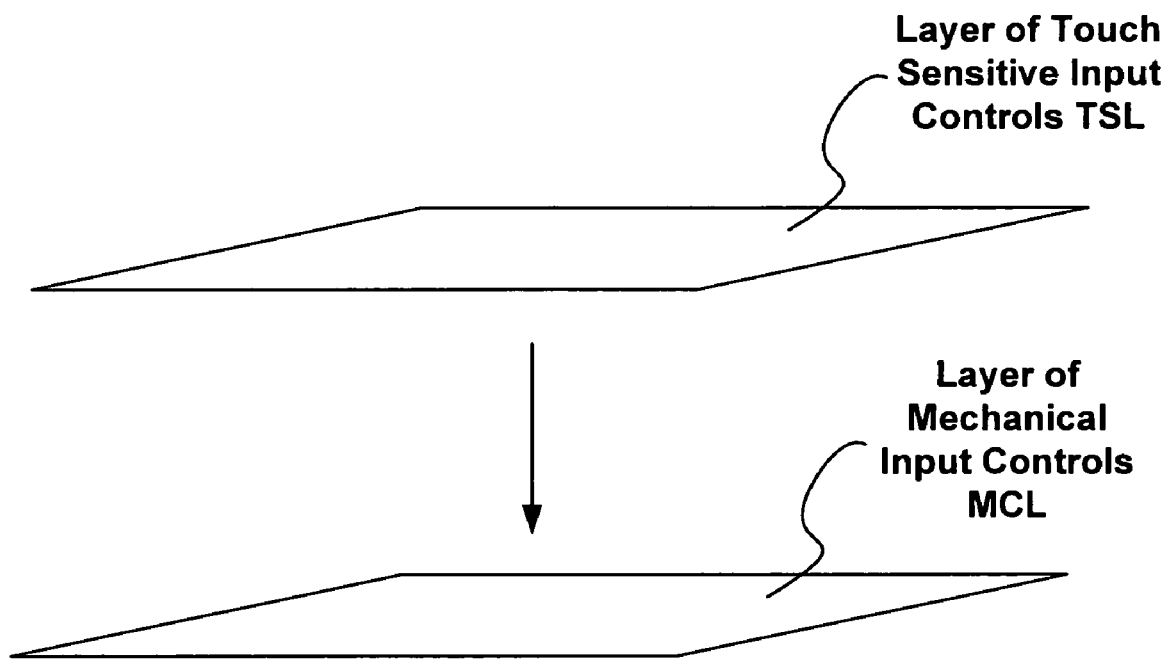
FIG. 1 is an illustration of the concept of applying a set of touch sensitive inputs over a set of mechanical controls in accordance with the invention.

As mentioned in the background, current hardware user interfaces for computing devices, remote controls, portable devices, and the like are inadequate to handle the ever evolving diverse functionality of the underlying devices they control. In consideration of the state of the art, the invention combines several types of user input devices into more simplified integrated designs.

Accordingly, in various embodiments, the invention provides a touch sensitive input portion or layer, such as a capacitive trackpad, and places the touch sensitive input portion on a mechanical layer of input controls, i.e., a set of mechanical switches (e.g., five to nine mechanical switches). In one aspect, the touch sensitive input portion can include indentations or surface textures that hint behavior, e.g., hint at an up/down path or left/right path. In another aspect, the invention may include a touch sensitive input layer, such as a capacitive trackpad, or touchpad, that takes (x, y) coordinate input that maps to a screen of a device being controlled by the input device. In another aspect, the touch sensitive input layer may be a touch sensitive screen, conveyor belt, or push pad overlaying a set of mechanical switches. In addition, a central switch may also be implemented on the touch sensitive input layer. As described below, any of the embodiments of the invention can be made as a user-replicable, or substitutable, part to enable customization and accessorizing of an input device in accordance with the invention.

For illustrative, non-limiting, examples, of a touch pad overlaying a set of up to 9 mechanical switches, e.g., generally arranged as a 3×3 array of mechanical switches, the following include three designs that may be implemented in accordance with the invention. In a first design, an Up, Down, Left, Right (UDLR) touchpad is provided with an appropriately textured surface to indicate up/down motion for scrolling and left/right gestures for horizontal scrolling, media transport navigation, etc. Left and right motion/gestures via the touch sensitive input layer are particularly advantageous in such an embodiment. In a second con-limiting XY touchpad design, a touchpad that takes input as (x, y) coordinates is mounted on mechanical switches for use as a directional pad. In a third exemplary, non-limiting design, the touch sensitive layer that is incorporated with the mechanical switches is a conveyer belt/treadmill with optimal tactile feel that enables input for vertical scrolling that is also mounted on the mechanical switches for 9 discrete inputs.

In various embodiments described herein, there are 1, 5, 8 and 9 mechanical switches shown generally in a 3×3 array arrangement. In a simple non-limiting case, a 5-way mechanical input pad provides up, down, left, right, and action functionality. With a 9-way mechanical input pad, one has the same inputs as the 5-way mechanical input pad, but also includes, at the diagonal extents, up-left, up-right, down-left and down-right functionality.

The invention thus provides a simple device face that achieves successful industrial design by integrating several controls into one physical embodiment. The invention, with its multiple planes of interaction, also enhances the user experience by providing additional tactile interaction with the input device in a way that is customizable for the function being performed. Additionally, the touch sensitive input portions of the invention may include acceleration sensitivity to detect relative motion of a finger's velocity over time for easier scrolling action and improved usability. With the additional scrolling enabled by the touch sensitive input layer, as well as corresponding mechanical switch functionality, fine tune scrolling can be effectively achieved by assigning fast scrolling to some pre-defined user input actions and assigning slow, or individual, scrolling to other pre-defined user input actions.

In various embodiments, as shown at a high level in FIG. 1, the invention provides a touch sensitive input portion or layer TSL, such as a capacitive trackpad, and places the touch sensitive input portion on a mechanical layer of input controls MCL. In various embodiments of the input device of the invention, multiple types of input techniques are combined into one user input control surface by combining 1, 5, 8 or 9 mechanical inputs with a touch sensitive input layer that can additionally be used for vertical scrolling, vertical and horizontal scrolling, and/or (x, y) coordinate input.

Figure 2A:
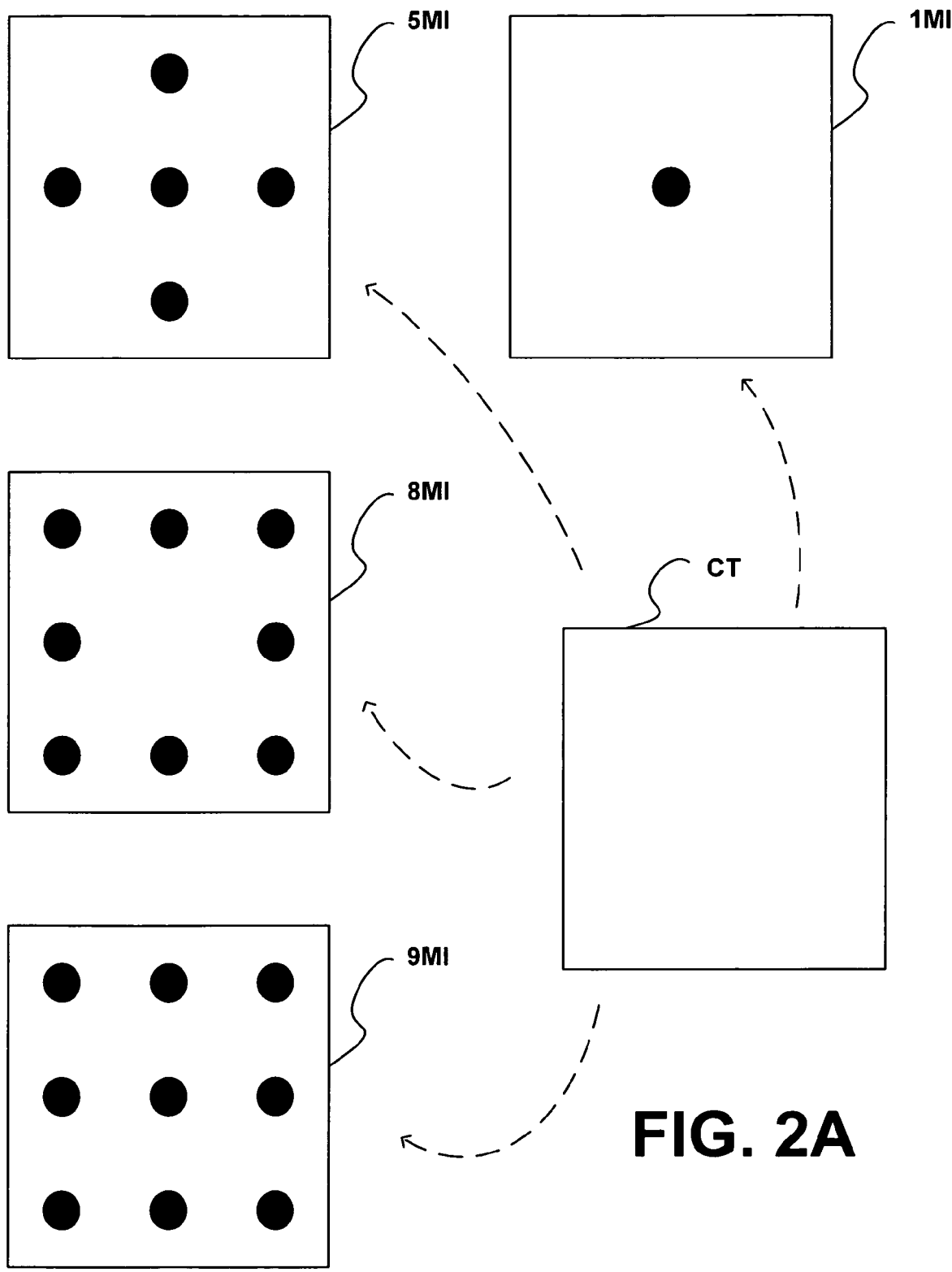
FIGS. 2A, 2B, 2C are block diagrams of first illustrative embodiments of a user interface in accordance with the invention in which the touch sensitive input device is shown as a capacitive touchpad.

As shown in FIG. 2A, in first illustrative embodiments of the invention, the touch sensitive input pad is a capacitive touch pad CT including a plurality of capacitive sensors for sensing human touch. As shown by the dotted arrows, in various embodiments of the invention, the capacitive touch pad CT is placed on top of mechanical switches, such as the embodiments of mechanical inputs 1MI, 5MI, 8MI and 9MI, having 1, 5, 8 and 9 mechanical inputs, respectively, to form integrated touch sensitive and mechanical input devices 201, 205, 208 and 209, respectively, in FIG. 2B.

Figure 2B:
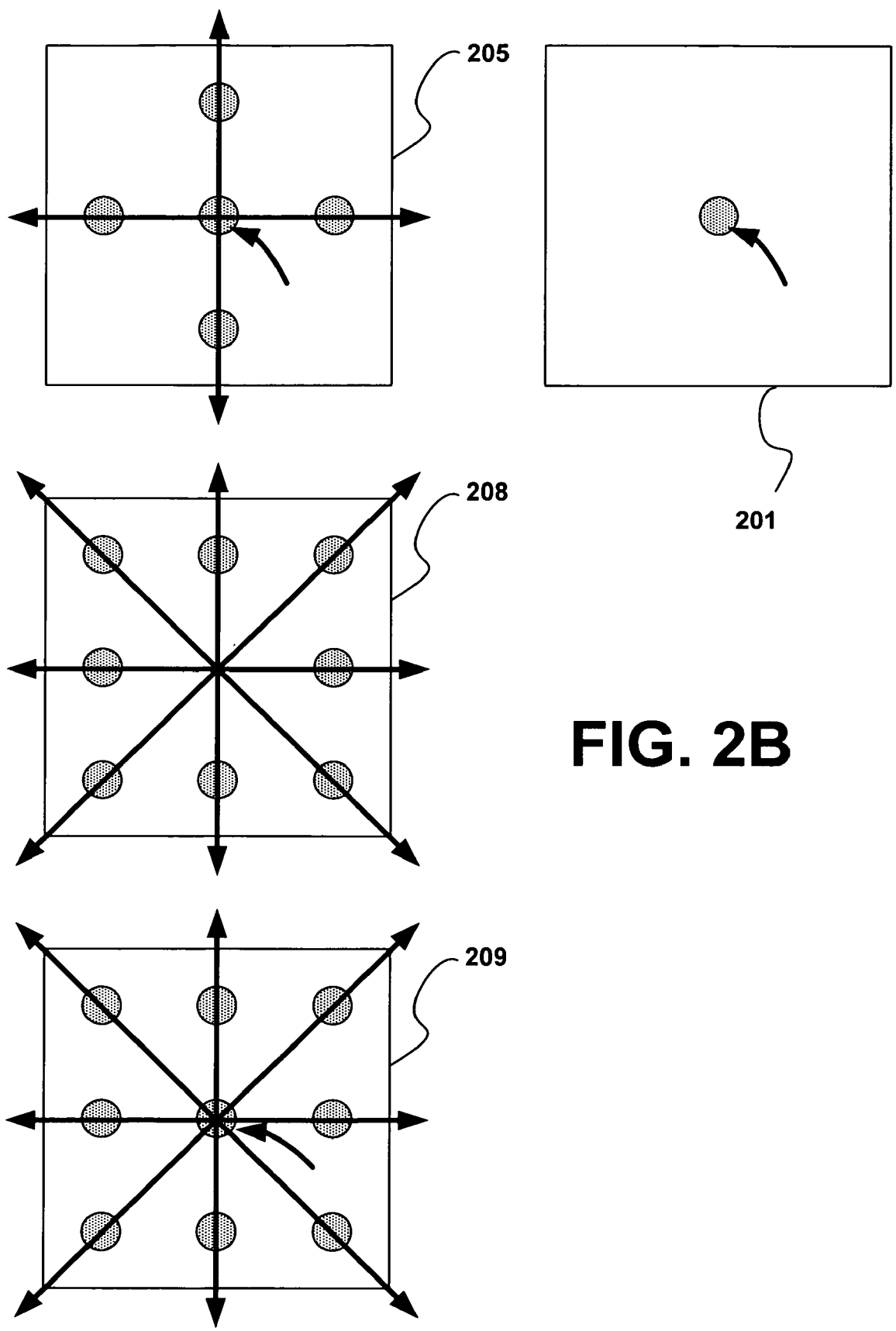

As shown in FIG. 2B, in embodiment 201, having a single mechanical input, in addition to providing touch sensitive input, a user may actuate a central mechanical switch by pressing the center of the pad 201. In embodiment 205, in addition to providing touch sensitive input and actuating a central mechanical switch, a user may actuate one of four directional mechanical switches located towards the horizontal and vertical extents of the pad 205. In embodiment 208, in addition to providing touch sensitive input and actuating one of four directional mechanical switches located towards the horizontal and vertical extents of the pad 208, a user may actuate one of four diagonal mechanical switches located towards the diagonal extents of the pad 208. In embodiment 209, in addition to providing touch sensitive input, a user may actuate a central mechanical switch, one of four directional mechanical switches located towards the horizontal and vertical extents of the pad 209 and one of four diagonal mechanical switches located towards the diagonal extents of the pad 209. Additional mechanical switches or a subset of the mechanical switches shown are also contemplated in accordance with embodiments of the invention.

Figure 2C:
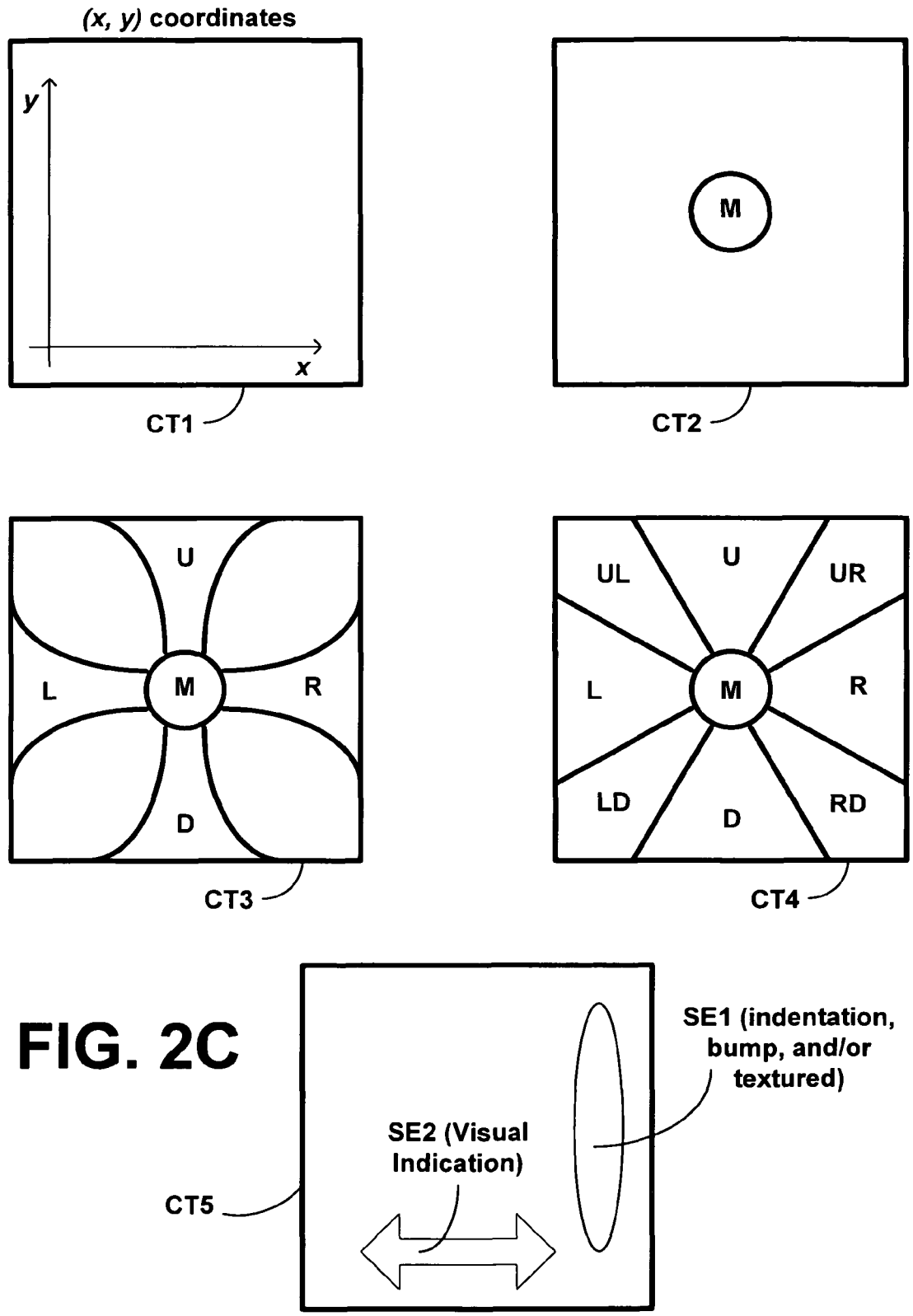

As shown in the embodiments of FIG. 2C, a capacitive touch pad in accordance with the invention can possess a variety of input processing characteristics. For instance, as shown in embodiment CT1, the capacitive touchpad CT1 receives and interprets (x, y) coordinate data, such as (x, y) coordinate data used as an alternative to mouse input. As shown in embodiment CT2, the capacitive touchpad CT2 includes a middle section or zone M, in which a user may invoke special functionality by touching the zone M, different than a functionality offered by touching outside the zone M. Or, a user may tap, or double tap, or press and hold the zone M to invoke such special functionality. In other words, the capacitive touchpad CT2 shows that a capacitive touchpad can be divided into separate zones, by associating subsets of the capacitive sensors comprising the touchpad to the zones. For instance, extending the idea further, capacitive touchpad embodiment CT3 shows four zones that may be defined for a capacitive touchpad (five zones including zone M), corresponding to left movement L, up movement U, right movement R, and down movement D. As shown in embodiment CT4, four additional zones can be defined substantially along the diagonals (from center) of the capacitive touchpad CT4.

Finally, in FIG. 2C, embodiment CT5 illustrates that a touch sensitive input pad, such as a capacitive touchpad, may comprise an additional surface effect, which can serve to guide the user of the input device of the invention. For instance, one or more surface effects SE1 may be included in a touch pad. For instance, indentation(s) in the surface of the pad, bumps on the surface of the pad, and/or different textures (e.g., rough v. smooth) can be utilized to differentiate a section or zone of the pad from another section or zone. Additionally, a surface effect SE2 may be as simple as an illustration (e.g., an arrow) or a different color (e.g., orange v. blue) to signal to the user of the interface that extra functionality may be initiated by interacting with surface effect SE2. The surface effects SE1, SE2, etc. may be included with any of the embodiments described herein.

Figure 2D:
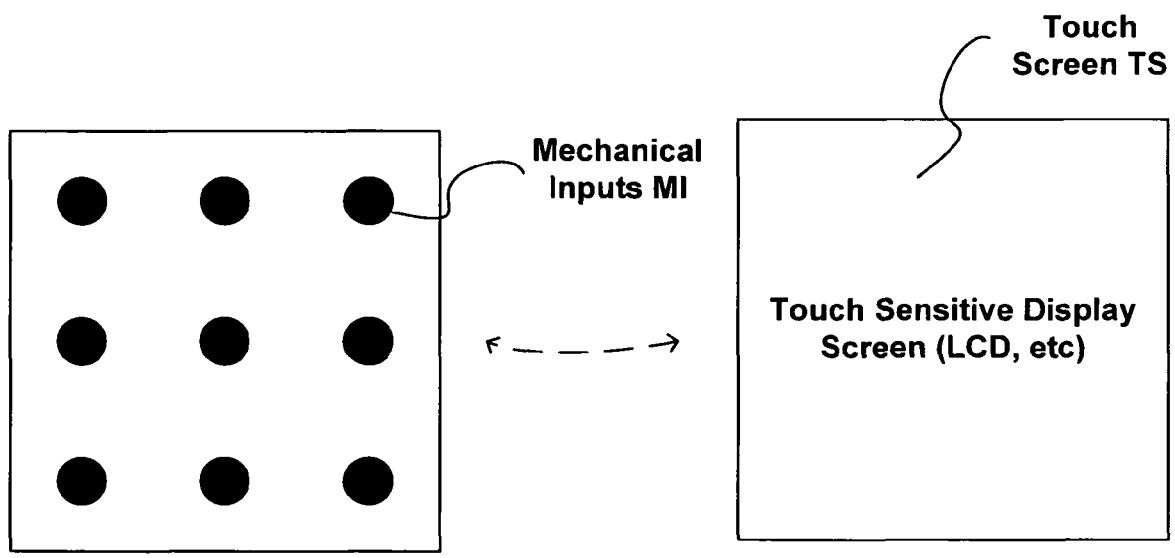
FIG. 2D is a block diagram of second illustrative embodiments of a user interface in accordance with the invention in which the touch sensitive input device is shown as a touch sensitive display.

FIG. 2D illustrates that a touch sensitive display screen, such as those employed by automatic teller machines, browser-enabled cell phones, tablet PCs, and the like, may be substituted for a capacitive touchpad wherever described in accordance with the invention. In this regard, a touch screen, e.g., a liquid crystal display (LCD) touchscreen, may also be divided into zones of input, as shown in FIG. 2C, and overlay mechanical switches as shown and described in connection with FIGS. 2A and 2B. Any surface effects can be simulated via the display, either via 2-D or 3-D images.

Figure 2E:
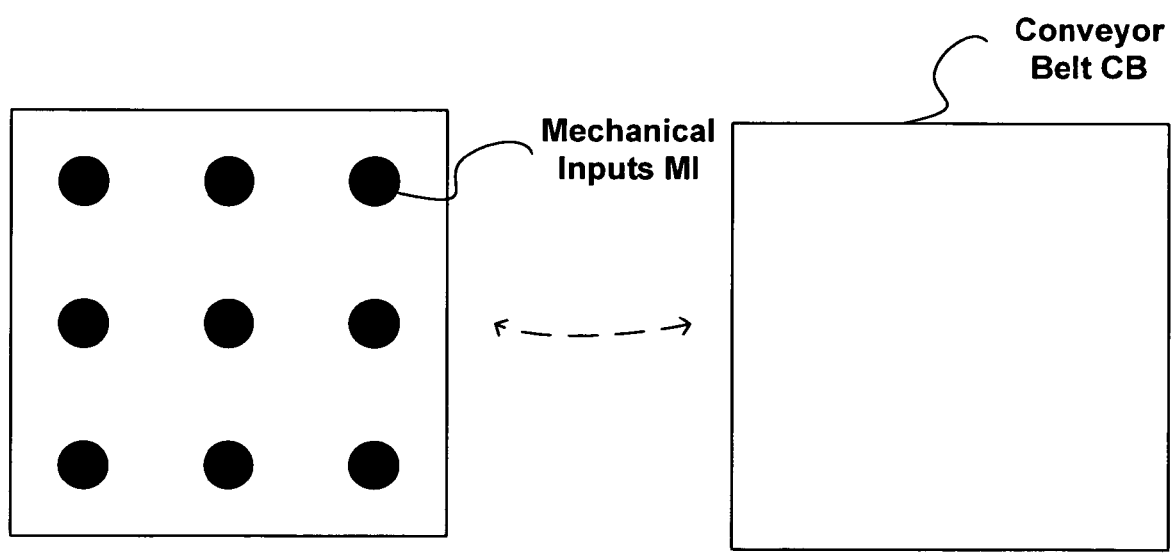
FIGS. 2E, 2F, 2G are block diagrams of third illustrative embodiments of a user interface in accordance with the invention in which the touch sensitive input device is shown as a conveyor belt.
Figure 2F:
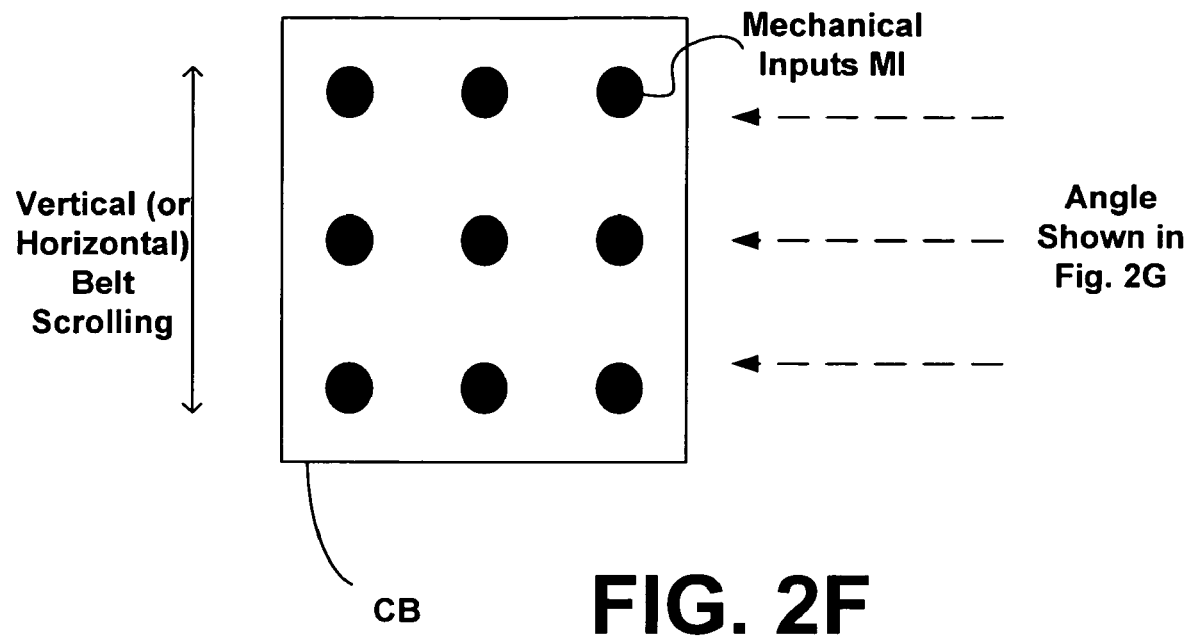
Figure 2G:
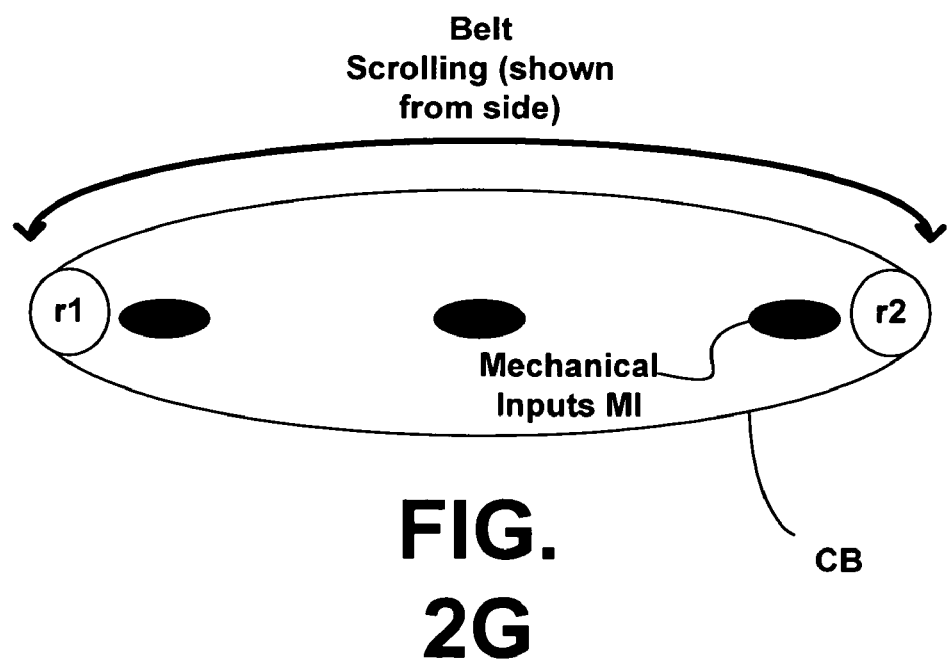
Figure 3A:
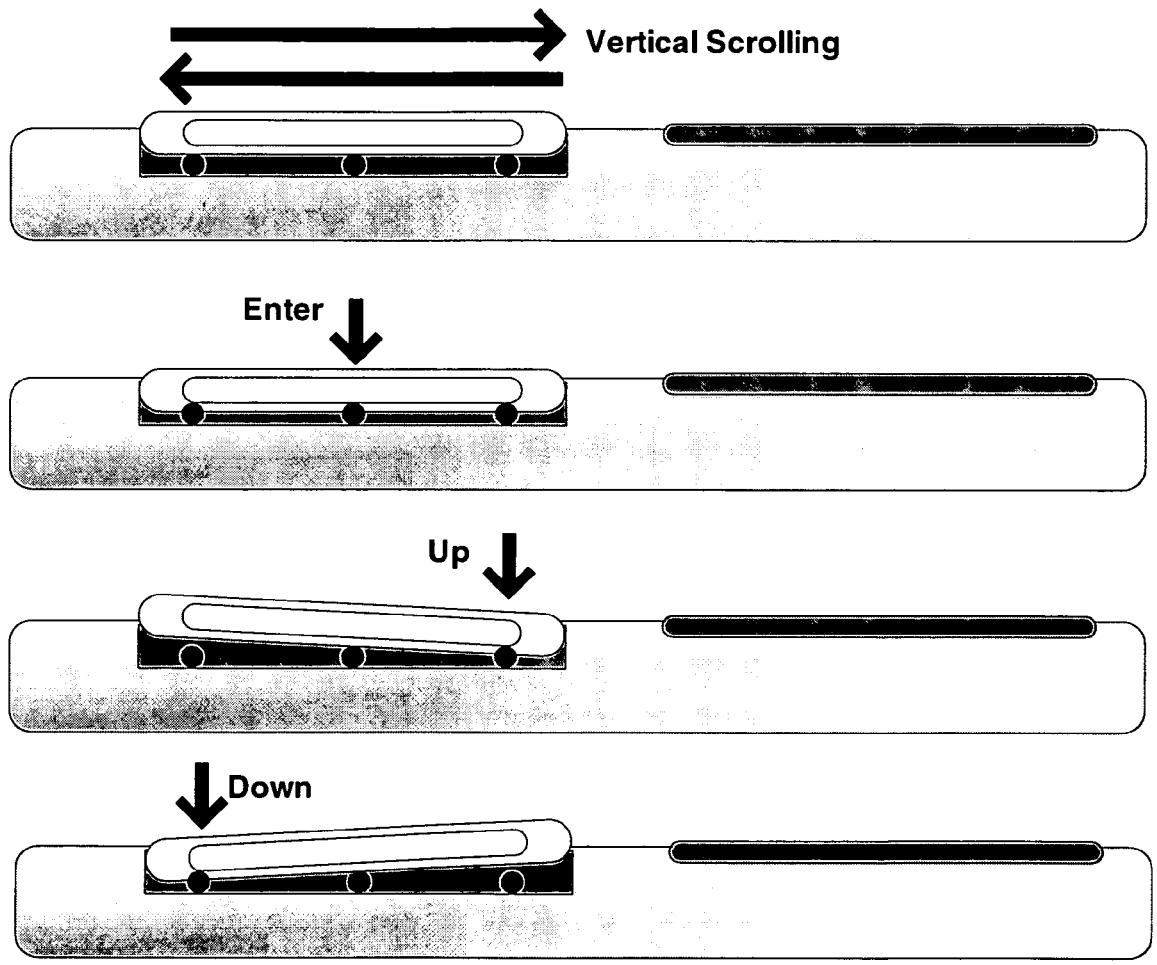
FIGS. 3A and 3B illustrate a plurality of input motions that can be accepted and processed by the input device of the invention according to various non-limiting embodiments.
Figure 3B:
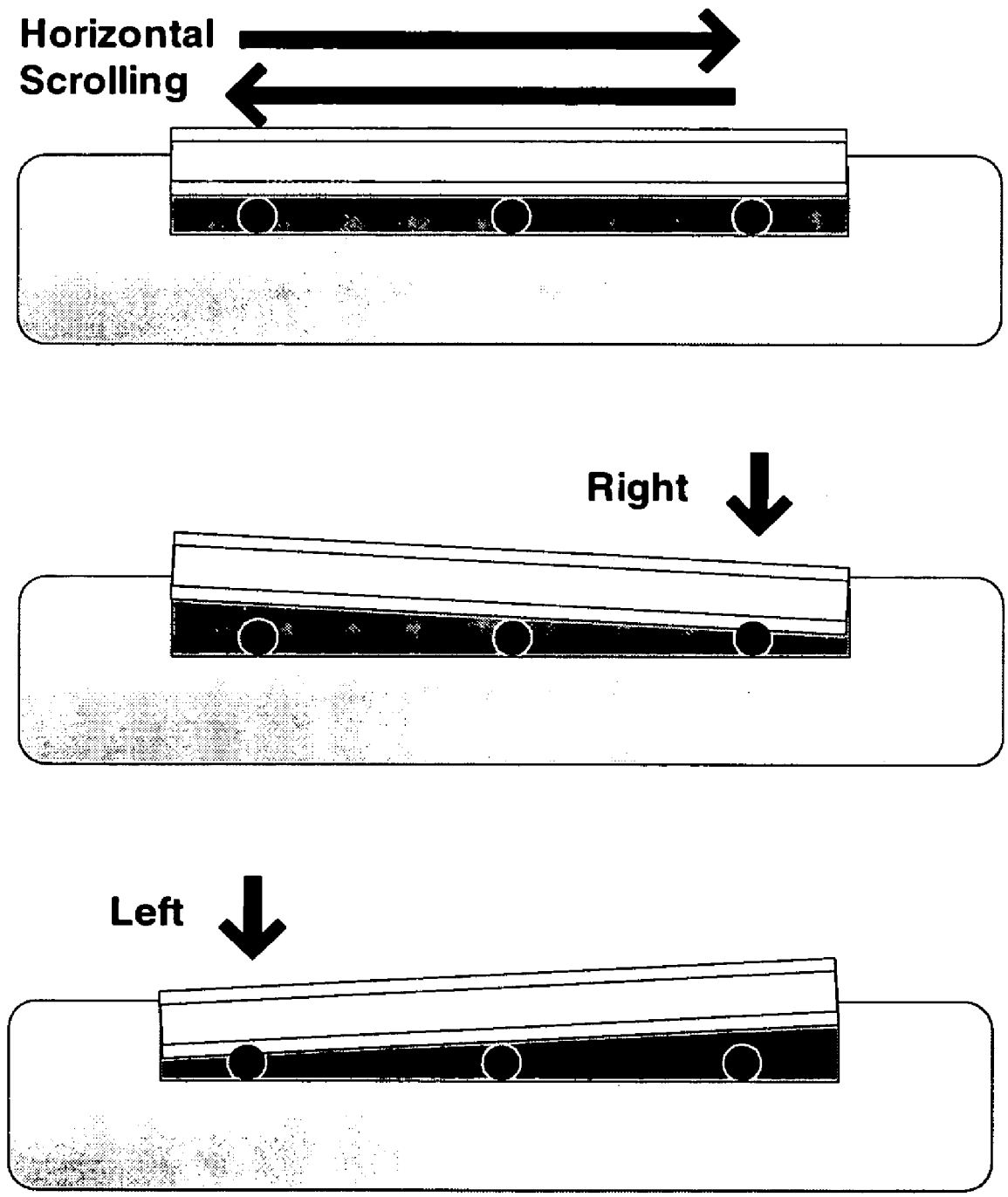

FIG. 2E illustrates that a conveyor belt CB can also be substituted for a capacitive touchpad wherever described in accordance with the invention. FIGS. 2F and 2G show what is meant by conveyor belt in more detail. For perspective, FIG. 2F shows a conveyor belt CB surrounding a set of mechanical switches MI from the perspective of a user of the input device. As shown by the arrow, a user can scroll a conveyor belt CB vertically either up or down to provide a desired input (e.g., list scrolling). As one can appreciate, the conveyor belt could also be positioned horizontally to scroll horizontally. In this regard, FIG. 2G provides a side perspective view of FIG. 2F at the perspective shown by the dotted arrows in order to further illustrate the conveyor belt CB of an input device of the invention. At least rollers r1, r2 support the conveyor belt CB and allow the conveyor belt CB to surround the mechanical inputs MI. Thus, as shown by the arrow, the conveyor belt CB may be moved over rollers r1, r2 imparting a relative motion to rollers r1, r2 that may be measured. Mechanical inputs MI may be placed entirely underneath the conveyor belt CB as well. In either case, pressing the input device assembly at the appropriate place on the touch sensitive pad actuates an underlying mechanical switch. FIGS. 3A and 3B illustrate exemplary non-limiting actuation of the underlying mechanical switches of the invention in more detail below.

FIG. 2H illustrates yet another example of a touch sensitive pad that may be placed on top of mechanical switches in accordance with the invention. FIG. 2H shows a push pad PP which may be physically displaced by a user's touch in a plane substantially parallel to the plane defined by the mechanical switches. For instance, the push pad PP can be moved left or right, or up or down relative to the mechanical switches to provide an independent basis for input. And, as with the other embodiments described herein, the push pad PP can be depressed in a direction substantially orthogonal to the plane of the paper to engage any one or more of the mechanical switches MI underlying the push pad PP.

As mentioned, FIGS. 3A and 3B highlight some of the distinct motions that may be detected in any of the above-described embodiments of the invention. FIG. 3A illustrates a side perspective view of a hypothetical portable media player having an input device in accordance with any of the embodiments of the invention having at least five mechanical switches underlying the touch sensitive input layer. In FIG. 3A, the top drawing shows that by dragging a finger across the touch sensitive input layer, vertical scrolling, or up/down input can be achieved. Similarly, by pressing along the center, top and bottom of the input device of the invention, as shown in the second from the top drawing, third from the top drawing and bottom drawing, respectively, a user can achieve "enter"/ "OK"/"Accept" functionality, distinct "Up" functionality and distinct "Down" functionality, respectively, via the underlying mechanical switches. Still further, as shown in FIG. 3B, the top drawing shows that by dragging a finger across the touch sensitive layer horizontally, a horizontal scrolling, or left/right input can be achieved. Moreover, by pressing the right side or left side of the input device as shown by the middle drawing and bottom drawing of FIG. 3B, respectively, a user can achieve a distinct "left" functionality and a distinct "right" functionality, respectively, via the underlying mechanical switches. As mentioned, the touchpad may also or alternately measure (x, y) finger coordinates as input (instead or in addition to horizontal and/or vertical scrolling). It should also be noted that any of the above-described mechanical switches may be given unique functionality, i.e., while in preferred embodiments, some mechanical inputs are described as corresponding to some pre-defined functionality (e.g., the one on the left provides "left" user input functionality), the same mechanical input can be assigned any function.

Figure 4:
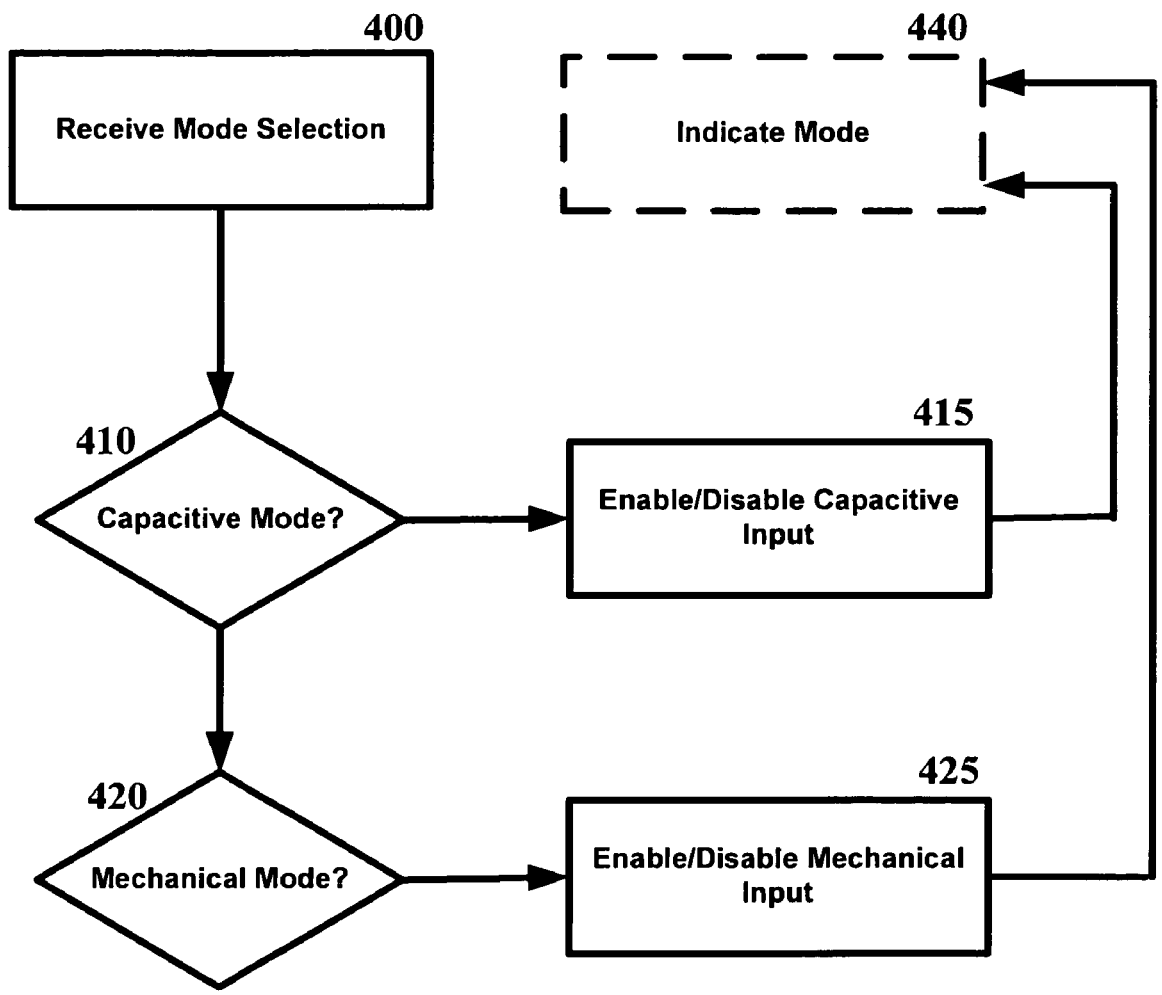
FIG. 4 is an exemplary, non-limiting flow diagram showing the enabling and disabling of touch sensitive input portions and mechanical input portions, both automatically according to the characteristics of input received, and manually as set in advance by a user of the input device.

FIG. 4 illustrates yet another aspect of the input devices of the invention that combine touch sensitive and mechanical user input components by overlaying the mechanical inputs with a touch sensitive layer. The integration of a touch sensitive layer over a set of mechanical switches implicates an additional handling of input on the interface side of the input device. In this respect, a device having both a touch sensitive input layer and a set of mechanical switches includes means to process both types of input. In this regard, the device thus includes software to automatically determine whether input received by the input device was intended for the touch sensitive layer or for the mechanical switches. In some cases, as a conflict resolution mechanism, it may even make sense to treat an input as affecting both a touch sensitive sensor and actuating an underlying mechanical switch, although ordinarily, an input will be regarded as affecting one or the other by analyzing the input and determining whether the input meets pre-requisite threshold requirements to be considered input by either the touch sensitive layer or the mechanical switches. These thresholds would be set based on the set of input capabilities of the input device. For instance, depending on whether a touch sensitive input layer was set to receive "double tap" or "press and hold" gestures, one might set the underlying algorithms for intelligently determining to where user input is directed differently.

Another aspect is that an interface, such as a software interface can be set to receive a mode for operation, so that the touch sensitive input portions and the mechanical input portions can be set to be enabled/disabled independently for each mode of operation. A simple example for an input device of the invention is one with only two modes: one in which the touch sensitive input portions are enabled, but the mechanical switches are disabled, and one in which the touch sensitive input portions are disabled, but the mechanical switches are enabled. However, multiple modes designating subsets of the touch sensitive and mechanical input portions can be defined as well. Thus, as shown in FIG. 4, in such a case, a user could set a mode for operation of the device, either explicitly at the device, or in the case of a remote control, a mode could be set explicitly at the device being controlled (or even implicitly due to a current operation being performed by the device, e.g., when the TV is playing, one does not need CD player functionality). At 400, the mode selection is received by the input device of the invention. At 410 and 420, it is determined for each capacitive and mechanical sensor, respectively, whether the current mode supports the enabling or disabling of that sensor at 415 and 425, respectively. At 440, the outputs of 415 and 425 may optionally be used to indicate and verify the mode of operation of the input device, e.g., via colored LEDs, or other visual cues, or audio or vibratory indications of mode.

Exemplary Networked and Distributed Environments

One of ordinary skill in the art can appreciate that the invention can be implemented in connection with any computer or other client or server device, which can be deployed as part of a computer network, or in a distributed computing environment, or which can be controlled by an input device. In this regard, the present invention pertains to any computer system or environment having any number of memory or storage units, and any number of applications and processes occurring across any number of storage units or volumes, which may be used in connection with controlling a computing device via a user interface in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may be controlled by a user interface of the present invention.

Figure 5:
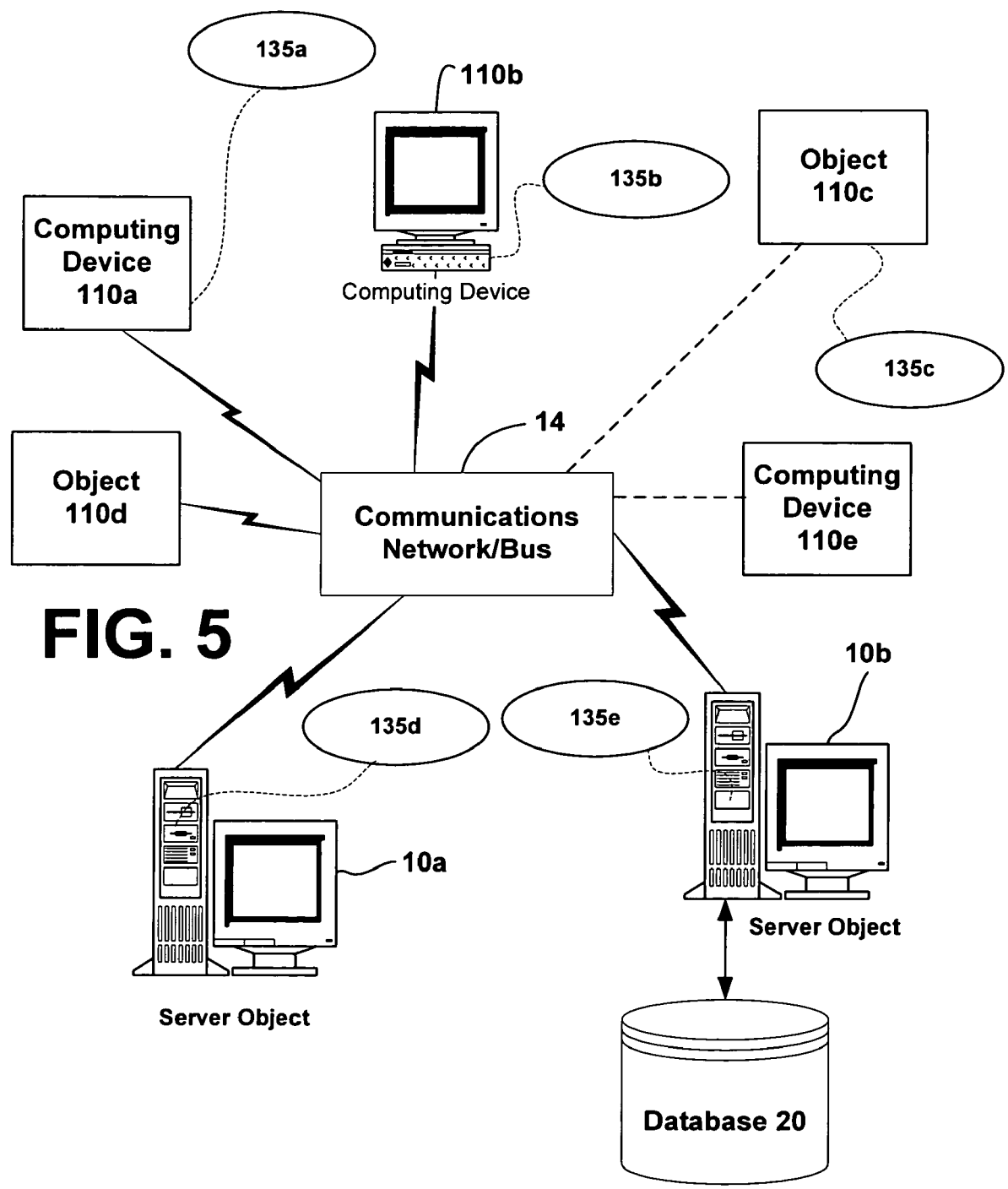
FIG. 5 is a block diagram representing an exemplary network environment in which the present invention may be implemented.

FIG. 5 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc., any one of which may be controlled by an embodiment of a user interface in accordance with the invention. Each object can communicate with another object by way of the communications network 14. This network may itself comprise other computing objects and computing devices that provide services to the system of FIG. 5, and may itself represent multiple interconnected networks. In accordance with an aspect of the invention, each object 10a, 10b, etc. or 110a, 110b, 110c, etc. may contain an application that might make use of an API, or other object, software, firmware and/or hardware, suitable for use or communications with the input devices provided in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to controlling a computing device with a user interface according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed, processed or utilized incident to program objects and interfaces, the operation of which may be implicated by input received in accordance with the invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 5, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may be implicated according to user input received by an input device in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 5 illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like, any of which may include or be controlled by the input devices in accordance with the present invention. It is thus contemplated that the present invention may apply to any computing device with which a human being may interact.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 6:
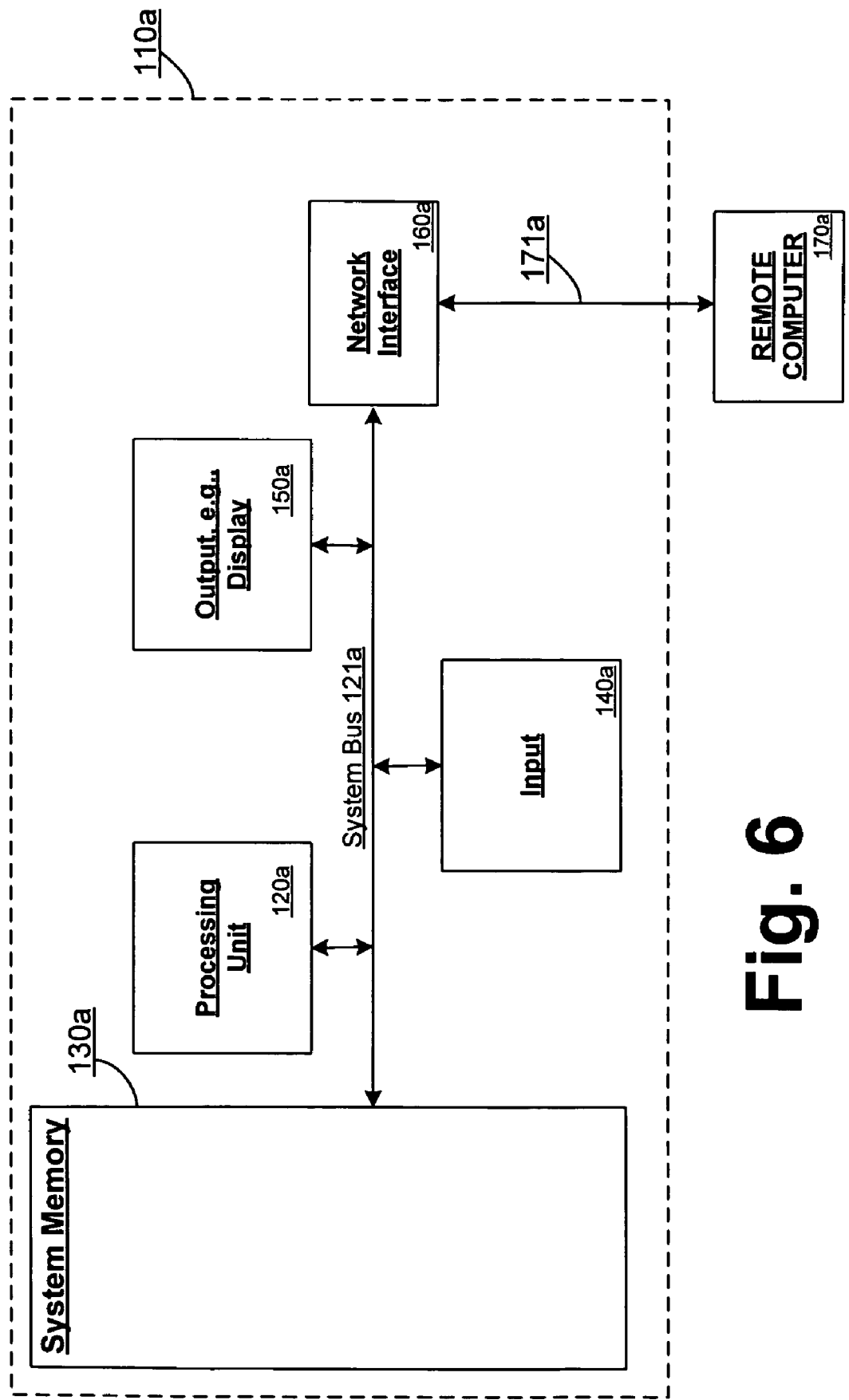
FIG. 6 is a block diagram representing an exemplary non-limiting computing system environment in which the present invention may be implemented.

As mentioned, the invention applies to any device wherein it may be desirable to include a hardware user interface for receiving input from a human being. It should be understood, therefore, that handheld, portable and other computing devices and computing objects of all kinds are contemplated for use in connection with an input device of the present invention. Accordingly, the below general purpose remote computer described below in FIG. 6 is but one example, and the present invention may be implemented with any client or portable device, whether standalone or having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the user interface component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 6 thus illustrates an example of a suitable computing system environment 100a in which the invention may be implemented, although as made clear above, the computing system environment 100a is only one example of a suitable computing environment for an input device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 6, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

In addition to a user interface according to the invention, a user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 6 include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Interface Implementations

For any exchange of data among multiple computers, such as between an input device of the invention and a corresponding device or component the input device is meant to control, there are interfaces for handling the various operations on each computer that can be implemented in hardware and/or software and which operate to receive, send and/or process the data in some fashion, according to the relevant applications and services being requested or provided. To the extent that one or more interface objects may be provided to achieve or implement any portion of the input devices provided in accordance with the invention, the invention is intended to encompass all such embodiments, and thus a general description of the kinds of interfaces that might be provided or utilized when implementing or carrying out the invention, as follows.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 7A:
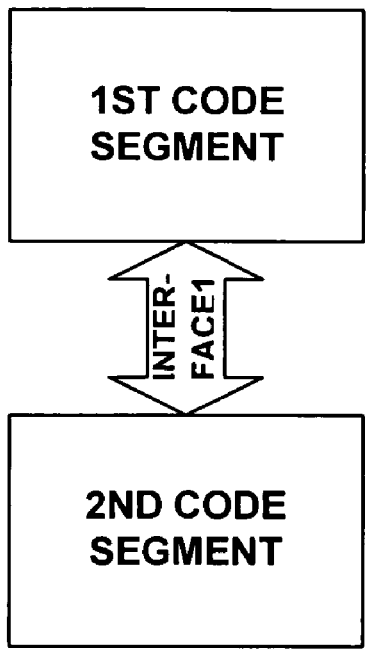
FIGS. 7A, 7B, 8A, 8B, 9A, 9B, 10A, 10B, 11A, 11B, 12A, 12B illustrate exemplary ways in which similar interface code can be provided to achieve similar or equivalent objective(s) of any interface(s) in accordance with the invention.
Figure 7B:
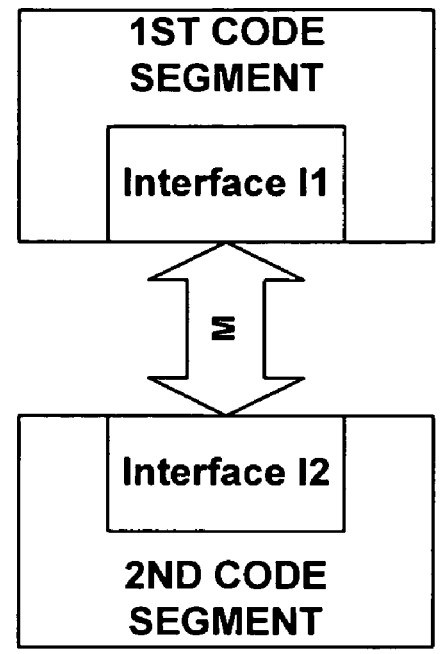

Notionally, a programming interface may be viewed generically, as shown in FIG. 7A or FIG. 7B. FIG. 7A illustrates an interface Interface1 as a conduit through which first and second code segments communicate. FIG. 7B illustrates an interface as comprising interface objects I1 and I2 (which may or may not be part of the first and second code segments), which enable first and second code segments of a system to communicate via medium M. In the view of FIG. 7B, one may consider interface objects I1 and I2 as separate interfaces of the same system and one may also consider that objects I1 and I2 plus medium M comprise the interface. Although FIGS. 7A and 7B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 7A and 7B, but they nonetheless perform a similar function to accomplish the same overall result. We will now briefly describe some illustrative alternative implementations of a programming interface.

A. Factoring

Figure 8A:
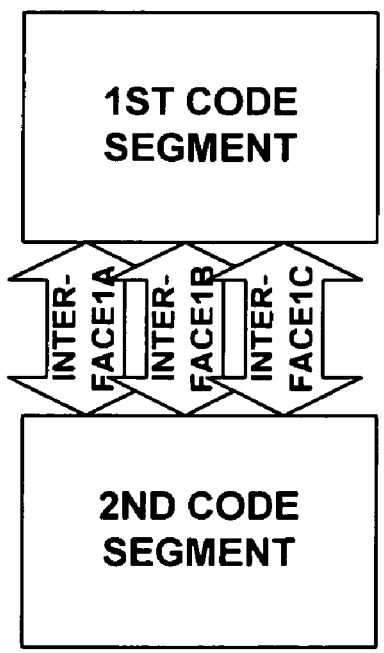
Figure 8B:
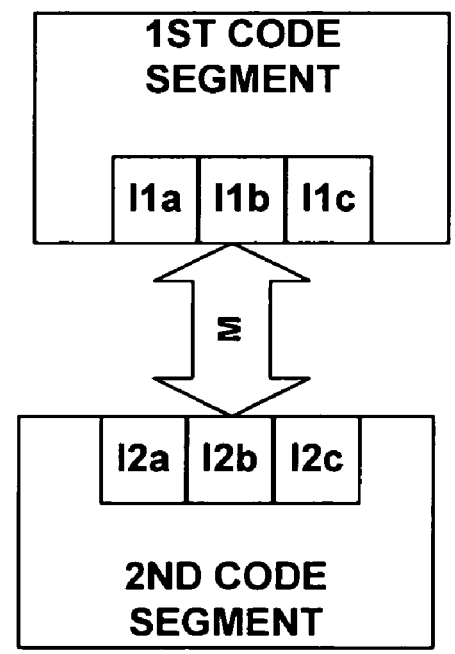

A communication from one code segment to another may be accomplished indirectly by breaking the communication into multiple discrete communications. This is depicted schematically in FIGS. 8A and 8B. As shown, some interfaces can be described in terms of divisible sets of functionality. Thus, the interface functionality of FIGS. 7A and 7B may be factored to achieve the same result, just as one may mathematically provide 24, or 2 times 2 time 3 times 2. Accordingly, as illustrated in FIG. 8A, the function provided by interface Interface1 may be subdivided to convert the communications of the interface into multiple interfaces Interface 1A, Interface 1B, Interface 1C, etc. while achieving the same result. As illustrated in FIG. 8B, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the $1^{st}$ code segment need not match the number of interfaces included with the $2^{nd}$ code segment. In either of the cases of FIGS. 8A and 8B, the functional spirit of interfaces Interface1 and I1 remain the same as with FIGS. 7A and 7B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 9A:
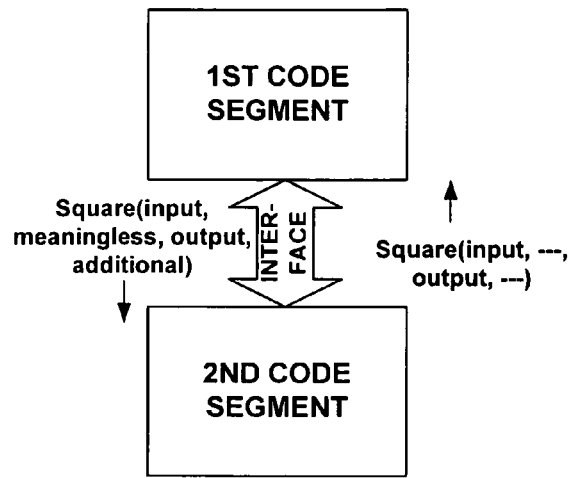
Figure 9B:
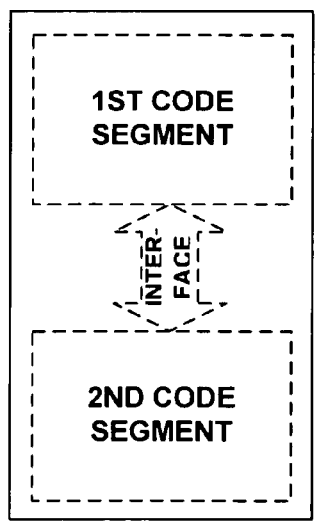

In some cases, it may be possible to ignore, add or redefine certain aspects (e.g., parameters) of a programming interface while still accomplishing the intended result. This is illustrated in FIGS. 9A and 9B. For example, assume interface Interface1 of FIG. 7A includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 9A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 9B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 10A:
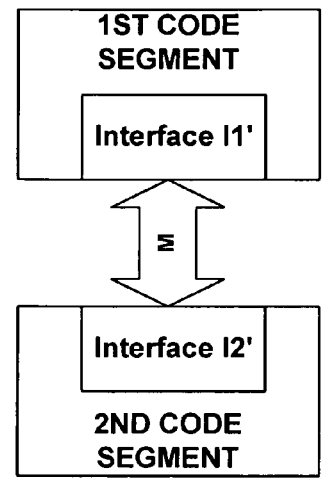
Figure 10B:
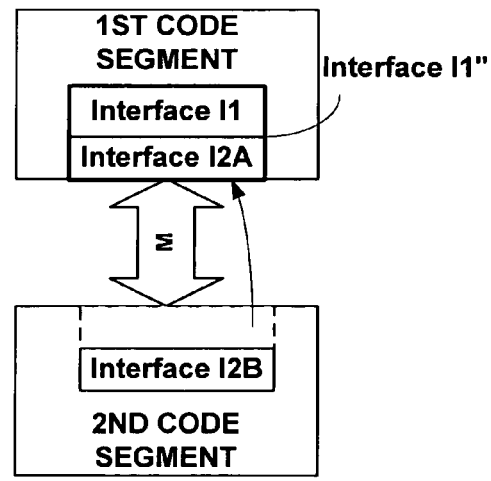

It may also be feasible to merge some or all of the functionality of two separate code modules such that the "interface" between them changes form. For example, the functionality of FIGS. 7A and 7B may be converted to the functionality of FIGS. 10A and 10B, respectively. In FIG. 10A, the previous $1^{st}$ and $2^{nd}$ Code Segments of FIG. 7A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 10B, part (or all) of interface I2 from FIG. 7B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 7B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 11A:
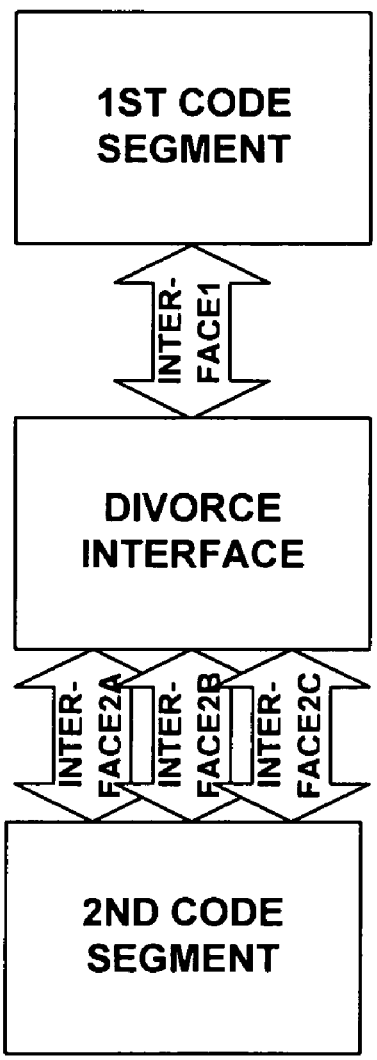
Figure 11B:
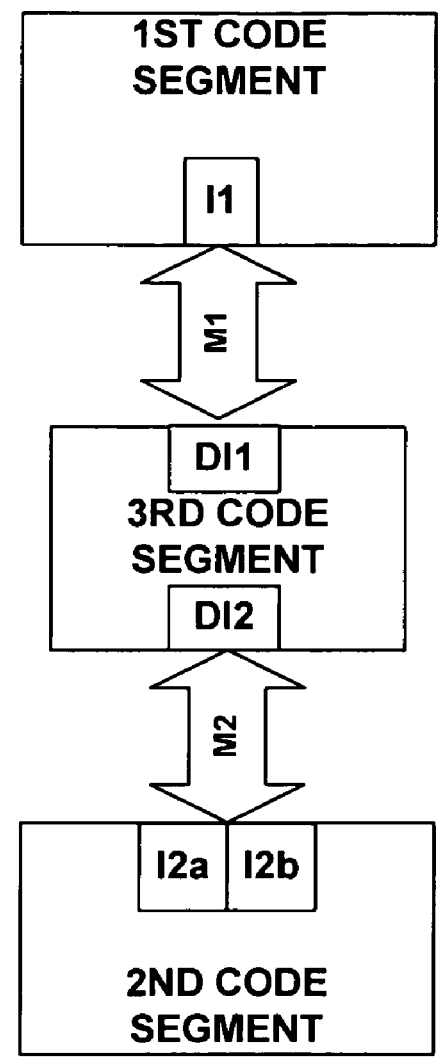

A communication from one code segment to another may be accomplished indirectly by breaking the communication into multiple discrete communications. This is depicted schematically in FIGS. 11A and 11B. As shown in FIG. 11A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 11B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 7B to a new operating system, while providing the same or similar functional result.

E. Rewriting

Figure 12A:
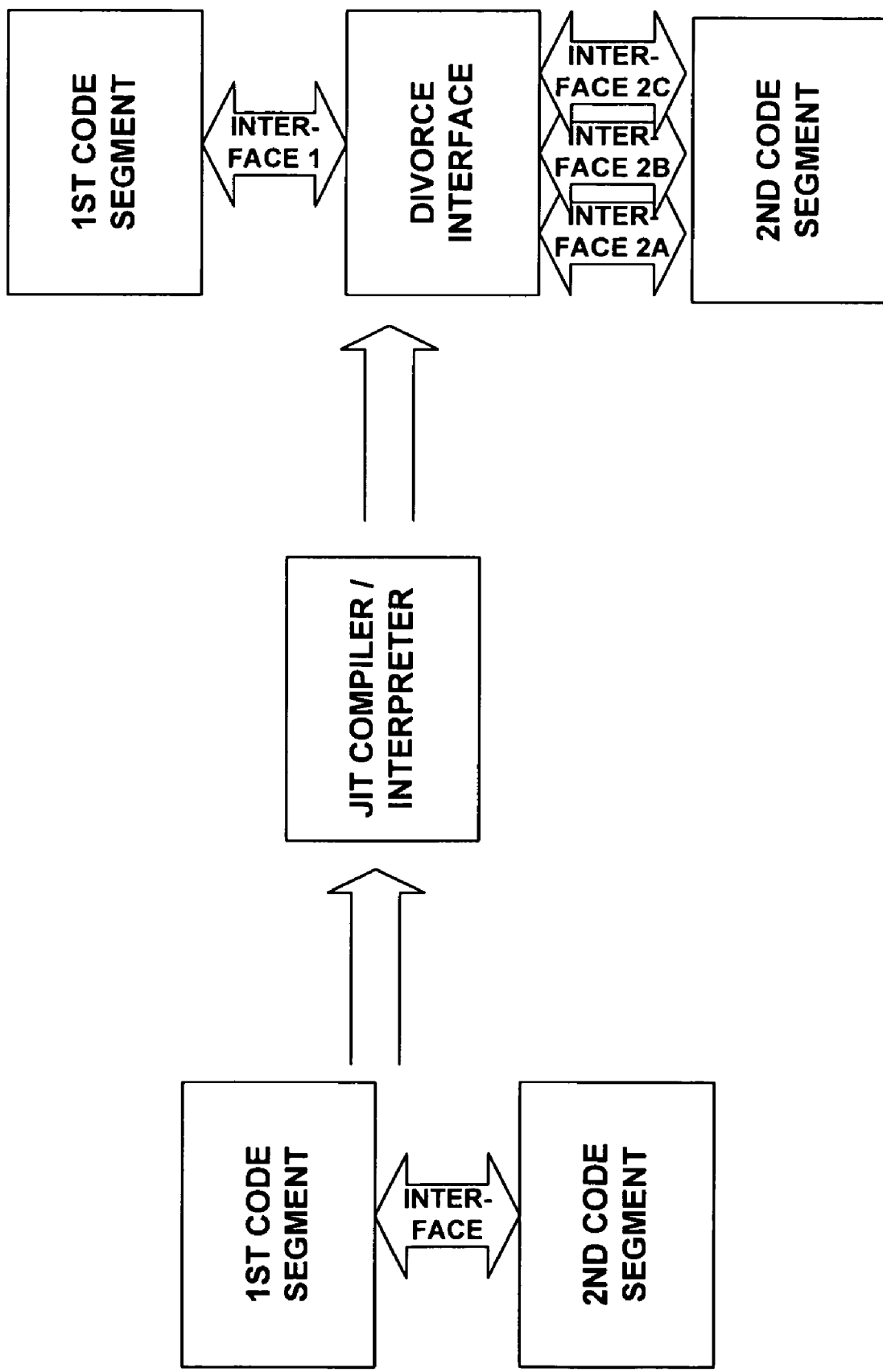
Figure 12B:
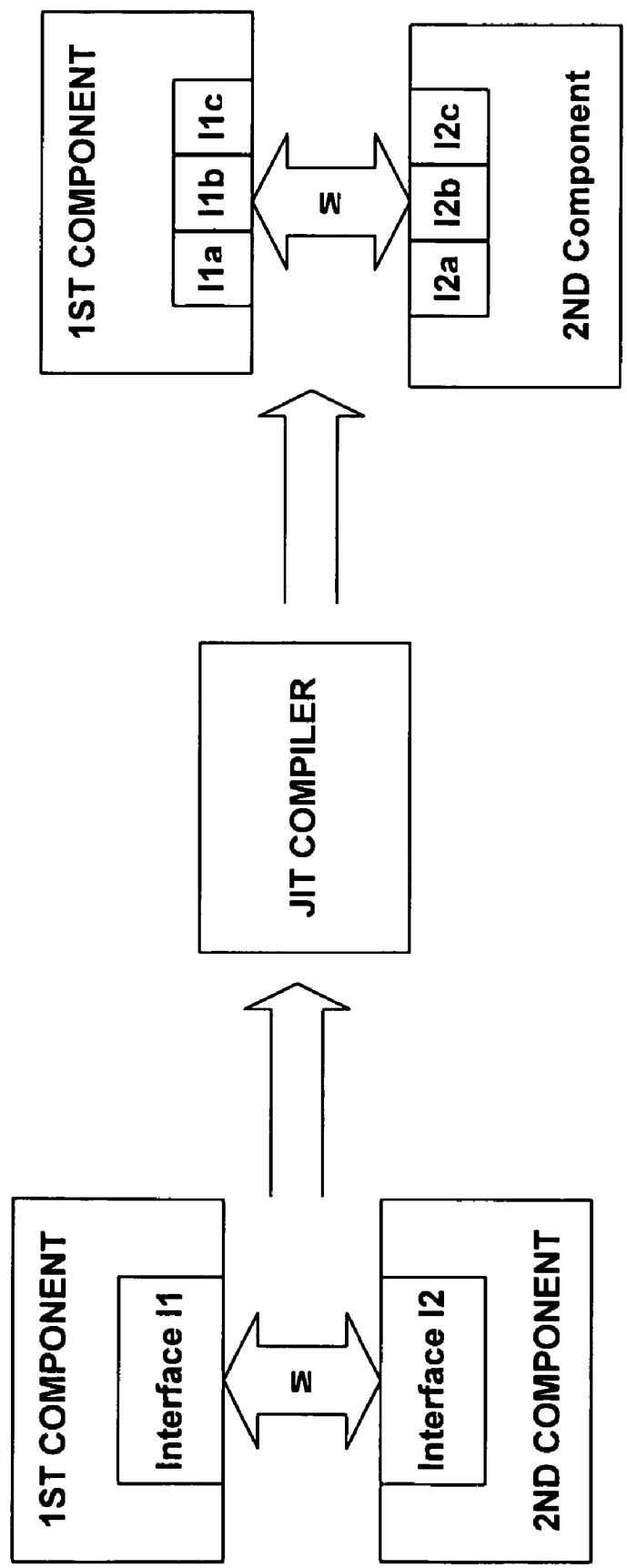

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 12A and 12B. As can be seen in FIG. 12A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 12B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 7A and 7B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

There are multiple ways of implementing the present invention, e.g., an appropriate API, tool kit, driver code, operating system, control, standalone or downloadable software object, etc. which enables applications and services to use an input device provided according to the invention. The invention contemplates the use of the invention from the standpoint of an API (or other software object), either on a host device being controlled by an input device of the invention where the input device operates as a remote control, or on the input device itself. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which an input device may be utilized to control the device or system. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. FIG. 4 illustrates one way of implementing an algorithmic flow for selecting between touch sensitive and mechanical input portions in accordance with an input mode of the invention; however, one of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize any software provided in accordance with the invention are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, functionality of the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A user interface component for controlling a computing device, comprising:
    at least one mechanical input movable by a user to provide at least first user input functionality for controlling the computing device;
    a touch sensitive input pad comprising a conveyor belt including at least one touch sensitive sensor and surrounding the at least one mechanical input wherein interaction with the at least one touch sensitive sensor by the user provides at least second user input functionality for controlling the computing device; and
    wherein the touch sensitive input pad further comprises a first plurality of touch sensitive control zones defined at the horizontal and vertical extents, and associated with a first set of directional mechanical switches, and a second plurality of touch sensitive control zones defined substantially along the diagonals from the center of the touch sensitive input pad and associated with a second set of directional mechanical switches.

2. A user interface component according to claim 1, wherein the at least one mechanical input includes at least five mechanical switches.

3. A user interface component according to claim 2, wherein the at least one mechanical input includes at most nine mechanical switches.

4. A user interface component according to claim 1, wherein the touch sensitive input pad is a capacitive touchpad or a touch sensitive display screen.

5. A user interface component according to claim 1, wherein the touch sensitive input pad conveyor belt comprises at least a plurality of rollers that support the conveyor belt and allow the conveyor belt to surround the at least one mechanical input or a touch pad that moves in a plane substantially parallel to a plane defined by a plurality of the at least one mechanical inputs underneath the touch sensitive input pad.

6. A user interface component according to claim 1, wherein the touch sensitive input pad includes at least one surface element for indicating a directional path of input for achieving the second user input functionality for controlling the computing device, wherein said at least one surface element is any of a raised portion, and indented portion or a surface textured portion.

7. A user interface component according to claim 1, wherein the touch sensitive input pad is a capacitive touchpad including a plurality of capacitive sensors for measuring left to right and right to left input by the user according to left to right and right to left motions by the user, respectively.

8. A user interface component according to claim 7, wherein the capacitive touchpad further includes a plurality of capacitive sensors for measuring up to down and down to up input by the user according to up to down and down to up motions by the user, respectively.

9. A user interface component according to claim 1, wherein the touch sensitive input pad is a capacitive touchpad including a plurality of capacitive sensors for measuring (x,y) coordinate input by the user according to (x,y) coordinate motion input by the user for controlling the computing device.

10. A user interface component according to claim 1, wherein the at least one mechanical input includes a central mechanical switch substantially centered under the overlaying touch sensitive input pad.

11. A computing device including the user interface component of claim 1.

12. A method for receiving user input from a user via a user interface component including a touch sensitive input pad located on top of at least one mechanical switch, comprising:
    receiving input via the user input component including the touch sensitive input pad in contact with the at least one mechanical switch, wherein the touch sensitive input pad comprises a conveyor belt that includes at least one touch sensitive sensor and surrounds said at least one mechanical switch; and
    determining whether said input applies to said touch sensitive input pad or to said at least one mechanical switch wherein the touch sensitive input pad further comprises a first plurality of touch sensitive control zones defined at the horizontal and vertical extents, and associated with a first set of directional mechanical switches, and a second plurality of touch sensitive control zones defined substantially along the diagonals from the center of the touch sensitive input pad and associated with a second set of directional mechanical switches.

13. A method according to claim 12, further comprising:

receiving an indication from the user whether input to the user interface component applies to the touch sensitive input pad or the at least one mechanical switch, and wherein said determining includes determining based on the indication.

14. A method according to claim 12, wherein said determining includes automatically determining whether said input applies to said touch sensitive input pad or to said at least one mechanical switch based on pre-determined algorithms.

15. A method according to claim 12, wherein if said input is determined to apply to said touch sensitive input pad, determining (x,y) coordinate input from said input.

16. A method according to claim 12, wherein if said input is determined to apply to said touch sensitive input pad, determining at least an amount of horizontal scrolling on the touch sensitive input pad.

17. A method according to claim 16, further comprising determining an amount of vertical scrolling on the touch sensitive input pad.

18. A computing device including means for performing the method of claim 12.

19. A user interface for a computing device, comprising:

means for receiving first input via at least one mechanical input arranged in a first layer of the user interface;

means for receiving second input via at least one touch sensitive sensor in a second layer on top of said first layer wherein at least one touch sensitive sensor of the second layer is directly above at least one mechanical input of the first layer;

means for surrounding the first and second layer input sensors by a conveyor belt comprising a touch sensitive input pad;

means for mounting said means for receiving second input on said means for receiving first input;

means for mounting a first plurality of touch sensitive control zones defined at the horizontal and vertical extents, and associated with a first set of directional mechanical switches, and a second plurality of touch sensitive control zones defined substantially along the diagonals from the center of the user interface and associated with a second set of directional mechanical switches.

20. A user interface according to claim 19, further comprising:

a computer readable medium comprising computer executable instructions for interfacing with said means for receiving first input and said means for receiving second input and for determining whether input received by the user interface applies to said means for receiving first input or said means for receiving second input.

* * * * *